US011935438B2

(12) United States Patent
Hu

(10) Patent No.: US 11,935,438 B2
(45) Date of Patent: Mar. 19, 2024

(54) BEND LIMITING DEVICE AND FLEXIBLE DISPLAY DEVICE

(71) Applicants: HUIZHOU CHINA STAR OPTOELECTRONICS DISPLAY CO., LTD., Huizhou (CN); SHENZHEN CHINA STAR OPTOELECTRONICS SEMICONDUCTOR DISPLAY TECHNOLOGY CO., LTD., Shenzhen (CN)

(72) Inventor: Xiaobo Hu, Huizhou (CN)

( * ) Notice: Subject to any disclaimer, the term of this patent is extended or adjusted under 35 U.S.C. 154(b) by 286 days.

(21) Appl. No.: 17/610,164

(22) PCT Filed: Oct. 13, 2021

(86) PCT No.: PCT/CN2021/123384
§ 371 (c)(1),
(2) Date: Nov. 10, 2021

(87) PCT Pub. No.: WO2023/050475
PCT Pub. Date: Apr. 6, 2023

(65) Prior Publication Data
US 2023/0101607 A1 Mar. 30, 2023

(51) Int. Cl.
*G09F 9/30* (2006.01)

(52) U.S. Cl.
CPC .................................... *G09F 9/301* (2013.01)

(58) Field of Classification Search
CPC ....................................................... G09F 9/301
See application file for complete search history.

(56) References Cited

U.S. PATENT DOCUMENTS 9,743,512 B2 * 8/2017 Chu ...................... G02F 1/1339
10,101,826 B2 * 10/2018 Lindblad ............... G06F 1/1652
(Continued)

FOREIGN PATENT DOCUMENTS

CN 104318869 A 1/2015
CN 204331666 U 5/2015
(Continued)

OTHER PUBLICATIONS

International Search Report in International application No. PCT/CN2021/123384,dated Jun. 27, 2022.
(Continued)

*Primary Examiner* — Lisa Lea-Edmonds

(57) ABSTRACT

A bend limiting device includes a flexible support film and limiting chains. The limiting chains are disposed on the flexible support film. Each of the limiting chains includes limiting blocks. Each of the limiting blocks includes limiting structures. One of the limiting structures of one of the limiting blocks is connected to one of the limiting structures of another one of the limiting blocks. When the bend limiting device is bent, two connected limiting structures of two adjacent limiting blocks limit a minimum value of an included angle formed between the two adjacent limiting blocks, so a radius of curvature of each of the limiting chains is limited to be greater than a preset value without being excessively bent. The bent limiting device protects a flexible display panel of a flexible display device from being improperly bent, so as to extend a lifespan of the flexible display device.

20 Claims, 8 Drawing Sheets

(56) References Cited

U.S. PATENT DOCUMENTS

| | | | | |
|---|---|---|---|---|
| 10,133,303 | B2 * | 11/2018 | Park | G06F 1/1616 |
| 10,151,424 | B2 * | 12/2018 | Hong | E05D 7/00 |
| 2010/0238612 | A1 * | 9/2010 | Hsiao | H05K 1/189 361/679.01 |
| 2017/0148419 | A1 * | 5/2017 | Zhang | G09G 3/035 |
| 2021/0325936 | A1 * | 10/2021 | Zhu | G06F 1/1652 |
| 2022/0121313 | A1 * | 4/2022 | Lindblad | G06F 3/0362 |
| 2022/0413548 | A1 * | 12/2022 | Sun | G06F 1/1607 |

FOREIGN PATENT DOCUMENTS

| | | | |
|---|---|---|---|
| CN | 105096752 | A | 11/2015 |
| CN | 106847099 | A | 6/2017 |
| CN | 107611161 | A | 1/2018 |
| CN | 108039121 | A | 5/2018 |
| CN | 109495610 | A | 3/2019 |
| CN | 110491294 | A | 11/2019 |
| CN | 110557475 | A | 12/2019 |
| CN | 112015237 | A | 12/2020 |

OTHER PUBLICATIONS

Written Opinion of the International Search Authority in International application No. PCT/CN2021/123384,dated Jun. 27, 2022.

Chinese Office Action issued in corresponding Chinese Patent Application No. 202111152376.0 dated Jan. 4, 2023, pp. 1-8.

* cited by examiner

BEND LIMITING DEVICE AND FLEXIBLE DISPLAY DEVICE

FIELD OF INVENTION

The present invention is related to the field of display technology and specifically to a bend limiting device and a flexible display device.

BACKGROUND OF INVENTION

In recent years, as consumers' habits of using mobile devices have changed, mobile devices with flexible display devices have gradually attracted attentions and developments by major display device manufacturers. By applying different bending methods to the flexible display devices, the flexible display devices can be applied to different usage scenarios to provide functions required by consumers. Common types of the flexible display devices include foldable flexible display devices and rollable flexible display devices.

A flexible display panel of a foldable flexible display device includes a folding region and a non-folding region. When the foldable flexible display device is folded, the folding region in the flexible display panel has a smaller radius of curvature. When the radius of curvature of the folding region is continuously reduced, which means that when the folding region is excessively bent, a crease appears in the folding region. The crease occurring to the flexible display panel not only affects a viewing effect, but also damages internal components of the flexible display panel and shortens a lifespan of the foldable flexible display device.

Different from a configuration of the foldable flexible display device, a flexible display panel of a rollable flexible display device does not specify a folding region and a non-folding region. When the rollable flexible display device is rolled, every region of the flexible display panel has a same radius of curvature, so that an internal stress of the flexible display panel is evenly dispersed, and a crease are less likely to occur. Therefore, the rollable flexible display device has a better development prospect.

However, if the rollable flexible display device is improperly operated, similarly, the flexible display panel may be excessively bent. A region where the flexible display panel is excessively bent also has a crease. The crease of the flexible display panel not only affect a viewing effect, but also damages internal components of the flexible display panel and shortens a lifespan of the rollable flexible display device.

Therefore, in prior art, neither the flexible display panel of the foldable flexible display device nor the flexible display panel of the rollable flexible display device can prevent technical problems caused by improper bending or improper rolling.

SUMMARY OF INVENTION

The present invention provides a bend limiting device and a flexible display device, which can prevent a flexible display device in prior art from being improperly bent or being improperly rolled that may cause technical problems that affect a viewing effect, damage internal components of the flexible display panel, and shortens a lifespan of a rollable flexible display device.

The bend limiting device provided by the present invention includes a flexible support film and a plurality of limiting chains. The flexible support film defined with a first direction, a second direction perpendicular to the first direction, and a third direction perpendicular to the first direction and the second direction. The first direction and the second direction are parallel to a first surface of the flexible support film. The limiting chains are disposed on the first surface of the flexible support film. Each of the limiting chains includes a plurality of limiting blocks arranged along the first direction or the second direction. Each of the limiting blocks includes a plurality of limiting structures. One of the limiting structures of one of the limiting blocks is connected to one of the limiting structures of another one of the limiting blocks. An included angle is formed between two adjacent limiting blocks, and when the bend limiting device is bent along a positive direction or a negative direction of the third direction, two connected limiting structures of the two adjacent limiting blocks limit a minimum value of the included angle between the two adjacent limiting blocks.

Each of the limiting structures of the bend limiting device of the present invention is prism shaped, and an axial direction of each of the limiting structures is parallel to the first direction or the second direction.

In an embodiment, each of the limiting structures is triangular prism shaped, a cross section of each of the limiting structures is isosceles triangle shaped, and a vertex angle of the isosceles triangle like shape is positioned at an outer side of each of the limiting blocks.

Furthermore, two base angles of the isosceles triangle like shape range from 10° to 80°.

In an embodiment, each of the limiting structures is rectangular prism shaped, a cross section of each of the limiting structures is isosceles trapezoid shaped, and an upper base of the isosceles trapezoid like shape is positioned at an outer side of each of the limiting blocks.

Furthermore, two acute angles of the isosceles trapezoid like shape range from 10° to 80°.

In an embodiment, a length of each of the limiting blocks in the first direction ranges from one millimeter to one centimeter, a length of each of the limiting blocks in the second direction ranges from one millimeter to one centimeter, and a length of each of the limiting blocks in the third direction ranges from one millimeter to one centimeter.

In an embodiment, the limiting blocks are made of a rigid material.

The flexible display device provided by the present invention including a bend limiting device. The bend limiting device includes a flexible support film and a plurality of limiting chains. The flexible support film defined with a first direction, a second direction perpendicular to the first direction, and a third direction perpendicular to the first direction and the second direction. The first direction and the second direction are parallel to a first surface of the flexible support film. The limiting chains are disposed on the first surface of the flexible support film. Each of the limiting chains includes a plurality of limiting blocks arranged along the first direction or the second direction. Each of the limiting blocks includes a plurality of limiting structures. One of the limiting structures of one of the limiting blocks is connected to one of the limiting structures of another one of the limiting blocks. An included angle is formed between two adjacent limiting blocks, and when the bend limiting device is bent along a positive direction or a negative direction of the third direction, two connected limiting structures of the two adjacent limiting blocks limit a minimum value of the included angle between the two adjacent limiting blocks.

Each of the limiting structures of the bend limiting device of the present invention is prism shaped, and an axial direction of each of the limiting structures is parallel to the first direction or the second direction.

In an embodiment, each of the limiting structures is triangular prism shaped, a cross section of each of the limiting structures is isosceles triangle shaped, and a vertex angle of the isosceles triangle like shape is positioned at an outer side of each of the limiting blocks.

Furthermore, two base angles of the isosceles triangle like shape range from 10° to 80°.

In an embodiment, each of the limiting structures is rectangular prism shaped, a cross section of each of the limiting structures is isosceles trapezoid shaped, and an upper base of the isosceles trapezoid like shape is positioned at an outer side of each of the limiting blocks.

Furthermore, two acute angles of the isosceles trapezoid like shape range from 10° to 80°.

In an embodiment, a length of each of the limiting blocks in the first direction ranges from one millimeter to one centimeter, a length of each of the limiting blocks in the second direction ranges from one millimeter to one centimeter, and a length of each of the limiting blocks in the third direction ranges from one millimeter to one centimeter.

In an embodiment, the limiting blocks are made of a rigid material.

In an embodiment, the flexible display device further includes a flexible display panel. The flexible display panel is disposed on a second surface opposite to the first surface.

In an embodiment, the limiting chains of the bend limiting device are disposed at a side edge of the flexible display panel.

In an embodiment, the limiting chains of the bend limiting device are disposed on a non-light-emitting surface of the flexible display panel.

In an embodiment, the flexible display panel includes a flexible liquid crystal display, an organic light-emitting diode display panel, a quantum dot light-emitting diode display panel, a mini light-emitting diode display panel, or a micro light-emitting diode display panel.

When the bend limiting device of the present invention is bent, the two connected limiting structures of the two adjacent limiting blocks limit a minimum value of the included angle formed between the two adjacent limiting blocks. By configuring each of the limiting structures on the outer side of each of the limiting blocks as the prism like shape and configuring the axial direction of each of the limiting structures to be parallel to the first direction or the second direction, a radius of curvature of each of the limiting chains can be limited to be greater than a preset value without being excessively bent. Furthermore, benefiting from a bending protection effect of the bend limiting device, a minimum radius of curvature of the flexible display panel having the bend limiting device of the flexible display device can be limited, so the flexible display device can be prevented from being improperly bent or being improperly rolled, thereby extending a lifespan of the flexible display device.

DETAILED DESCRIPTION OF EMBODIMENTS

In order to make the above purposes, features, and advantages of the present invention more obvious and understandable, the following is a detailed description of preferred embodiments of the present invention in conjunction with accompanying drawings.

Figure 1:
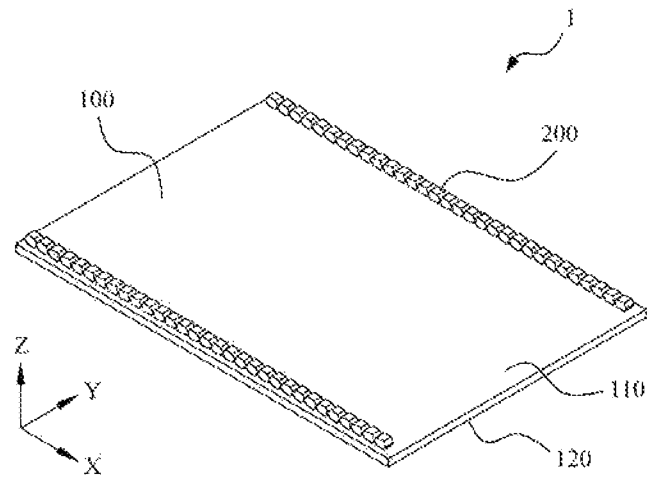
FIG. 1 is a structural schematic diagram of a bend limiting device of the present invention.
Figure 2:
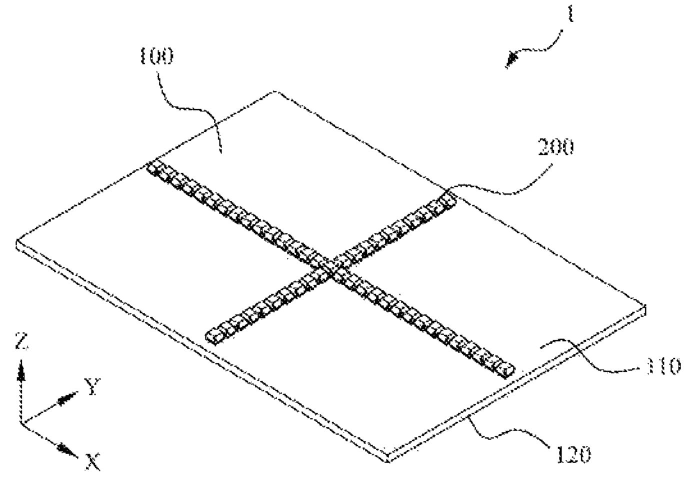
FIG. 2 is another structural schematic diagram of a bend limiting device of the present invention.

The present invention provides a bend limiting device 1. Please refer to FIG. 1, which is a structural schematic diagram of the bend limiting device 1 of the present invention. Please refer to FIG. 2, which is another structural schematic diagram of the bend limiting device 1 of the present invention. As shown in FIGS. 1 and 2, the bend limiting device 1 includes a flexible support film 100 and a plurality of limiting chains 200. The flexible support film 100 includes a first surface 110 and a second surface 120. The flexible support film 100 further defined with a first direction X, a second direction Y perpendicular to the first direction X, and a third direction Z perpendicular to the first direction X and the second direction Y. The first direction X and the second direction Y are parallel to the first surface 110 and the second surface 120 of the flexible support film 100. The limiting chains 200 are disposed on the first surface 110 of the flexible support film 100.

As shown in FIG. 1, in an embodiment, the bend limiting device 1 has two parallel limiting chains 200 arranged along the first direction X. As shown in FIG. 2, in another embodiment, the bend limiting device 1 has two intersecting limiting chains 200 arranged along the first direction X and the second direction Y.

It should be noted that configurations of the limiting chains 200 of the bend limiting device 1 of the present invention is not limited to the above configurations. FIG. 1 only takes the bend limiting device 1 having two parallel limiting chains 200 as an exemplary illustration. FIG. 2 only takes the bend limiting device 1 having two intersecting limiting chains 200 as an exemplary illustration. Configurations of the limiting chains 200 can be adjusted according to actual requirements.

First Embodiment

Figure 3:
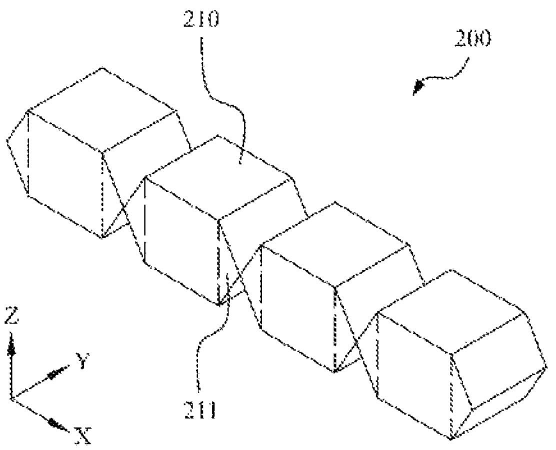
FIG. 3 is a partial structural schematic diagram of one of limiting chains shown in FIG. 1.

Please refer to FIG. 3, which is a partial structural schematic diagram of one of the limiting chains 200 shown in FIG. 1. In this embodiment, each of the limiting chains 200 includes a plurality of limiting blocks 210 arranged along the first direction X. Each of the limiting blocks 210 includes a plurality of limiting structures 211. One of the limiting structures 211 of one of the limiting blocks 210 is connected to one of the limiting structures 211 of another one of the limiting blocks 210. In this embodiment, each of the limiting blocks 210 has two limiting structures 211 arranged opposite to each other, and one of the limiting structures 211 positioned in a positive direction of the first direction X of one of the limiting blocks 210 is connected to one of the limiting structures 211 positioned in a negative direction of the first direction X of another one of the limiting blocks 210.

Figure 4:
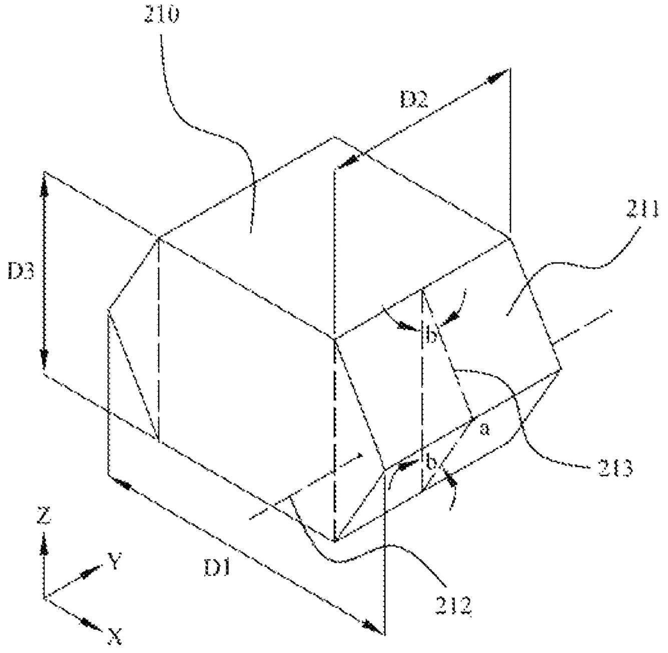
FIG. 4 is a structural schematic diagram of one of limiting blocks shown in FIG. 3.

Please refer to FIG. 4, which is a structural schematic diagram of one of the limiting blocks 210 shown in FIG. 3. Each of the limiting blocks 210 includes the limiting structures 211. Each of the limiting structures 211 is prism shaped. An axial direction 212 of each of the limiting structures 211 is parallel to the second direction Y.

As shown in FIG. 4, each of the limiting structures 211 is triangular prism shaped, and a cross section 213 of each of the limiting structures 211 is isosceles triangle shaped. A vertex angle a of the isosceles triangle like shape is positioned at an outer side of each of the limiting blocks 210. In this embodiment, two base angles b of the isosceles triangle like shape respectively range from 10° to 80°.

In this embodiment, a length D1 of each of the limiting blocks 210 in the first direction X ranges from one millimeter to one centimeter, a length D2 of each of the limiting blocks 210 in the second direction Y ranges from one millimeter to one centimeter, and a length D3 of each of the limiting blocks 210 in the third direction Z ranges from one millimeter to one centimeter. A size of each of the limiting blocks 210 of the present invention is not limited to this configuration, and the size of each of the limiting blocks 210 can be adjusted according to actual requirements.

Figure 5:
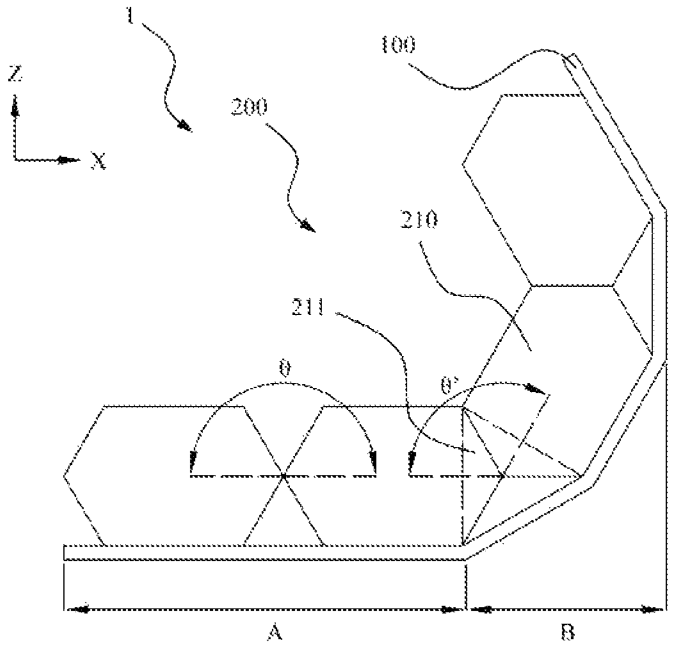
FIG. 5 is a partial side view of one of the limiting chains shown in FIG. 3 in a bending state.

Please refer to FIG. 5, which is a partial side view of one of the limiting chains 200 shown in FIG. 3 in a bending state. FIG. 5 shows a state that the bend limiting device 1 is bent along a positive direction of the third direction Z. In an unbent region A of the bend limiting device 1, an included angle θ formed between two adjacent limiting blocks 210 is a flat angle, which is 180°. In a bent region B of the bend limiting device 1, a minimum value θ' of the included angle θ formed between the two adjacent limiting blocks 210 is limited by two connected limiting structures 211 of the two adjacent limiting blocks 210.

Figure 6:
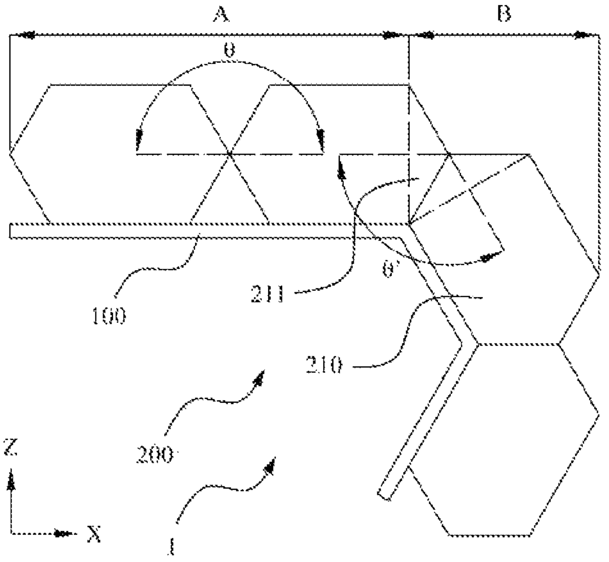
FIG. 6 is a partial side view of one of the limiting chains shown in FIG. 3 in another bending state.

Please refer to FIG. 6, which is a partial side view of one of the limiting chains 200 shown in FIG. 3 in another bending state. FIG. 6 shows a state that the bend limiting device 1 is bent along a negative direction of the third direction Z. In an unbent region A of the bend limiting device 1, the included angle θ formed between two adjacent limiting blocks 210 is a flat angle, which is 180°. In a bent region B of the bend limiting device 1, a minimum value θ' of the included angle θ formed between the two adjacent limiting blocks 210 is also limited by two connected limiting structures 211 of the two adjacent limiting blocks 210.

In this embodiment, since the cross section 213 of each of the limiting structures 211 is configured to be the isosceles triangle like shape, and the two base angles b of the isosceles triangle like shape are determined to respectively range from 10° to 80°, no matter the bend limiting device 1 is bent along the positive direction or the negative direction of the third direction Z, the minimum value θ' of the included angle θ formed between the two adjacent limiting blocks 210 can be limited to be greater than 20°. Therefore, a radius of curvature of each of the limiting chains 200 can be limited to be greater than a preset value without being excessively bent or being excessively folded.

Second Embodiment

Figure 7:
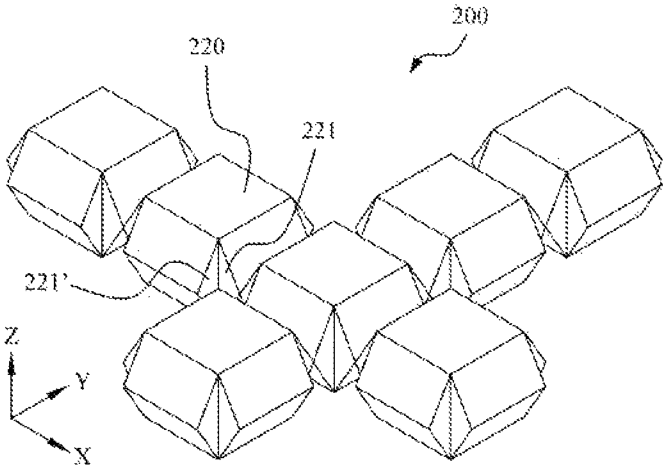
FIG. 7 is a partial structural schematic diagram of limiting chains shown in FIG. 2.

Please refer to FIG. 7, which is a partial structural schematic diagram of two limiting chains 200 shown in FIG. 2. In this embodiment, one of the limiting chains 200 includes a plurality of limiting blocks 220 arranged along the first direction X, and another one of the limiting chains 200 includes a plurality of limiting blocks 220 arranged along the second direction Y. Since the first direction X is perpendicular to the second direction Y, the two limiting chains 200 cross to each other.

Each of the limiting blocks 220 includes a plurality of limiting structures 221 and 221'. One of the limiting structures 221 or 221' of one of the limiting blocks 220 is connected to one of the limiting structures 221 or 221' of another one of the limiting blocks 220. In this embodiment, each of the limiting blocks 220 includes two limiting structures 221 arranged opposite to each other and two limiting structures 221' arranged opposite to each other. One of the limiting structures 221 positioned in a positive direction of the first direction X of one of the limiting blocks 220 is connected to one of the limiting structures 221 positioned in a negative direction of the first direction X of another one of the limiting blocks 220, and one of the limiting structures 221' positioned in a positive direction of the second direction Y of one of the limiting blocks 220 is connected to the limiting structures 221' positioned in a negative direction of the second direction Y of another one of the limiting blocks 220.

Figure 8:
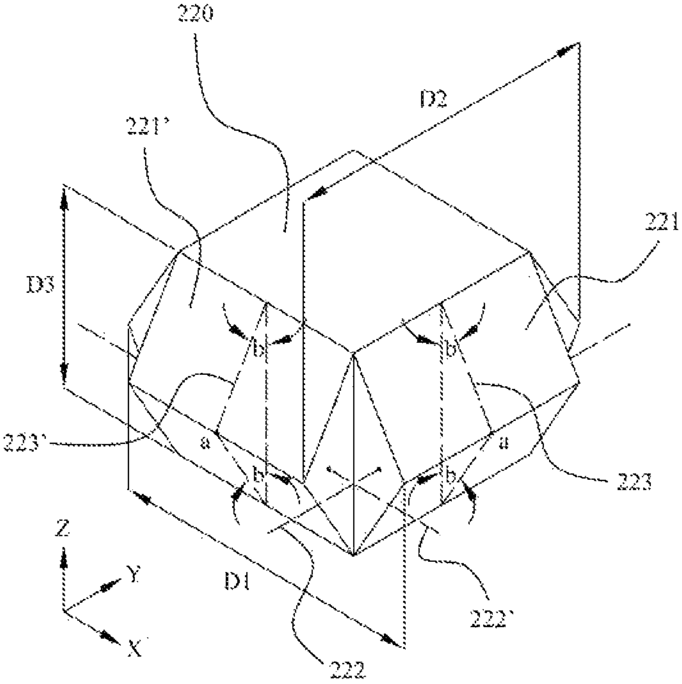
FIG. 8 is a structural schematic diagram of one of limiting blocks shown in FIG. 7.

Please refer to FIG. 8, which is a structural schematic diagram of one of the limiting blocks shown in FIG. 7. Each of the limiting blocks 220 includes the limiting structures 221 and 221'. Each of the limiting structures 221 and 221' is prism shaped. An axial direction 222 of each of the limiting structures 221 is parallel to the second direction Y, and an axial direction 222' of each of the limiting structures 221' is parallel to the first direction X.

As shown in FIG. 8, each of the limiting structures 221 and 221' is triangular prism shaped, a cross section 223 of each of the limiting structures 221 is isosceles triangle shaped, and a cross section 223 of each of the limiting structures 221' is the isosceles triangle like shape. A vertex angle a of the isosceles triangle like shape is positioned at an outer side of each of the limiting blocks 220. In this embodiment, two base angles b of the isosceles triangle like shape respectively range from 10° to 80°.

In this embodiment, a length D1 of each of the limiting blocks 220 in the first direction X ranges from one millimeter to one centimeter, a length D2 of each of the limiting blocks 220 in the second direction Y ranges from one millimeter to one centimeter, and a length D3 of each of the limiting blocks 220 in the third direction Z ranges from one millimeter to one centimeter. A size of each of the limiting blocks 220 of the present invention is not limited to this configuration, and the size of each of the limiting blocks 220 can be adjusted according to actual requirements.

The bending state of the bend limiting device 1 in this embodiment is similar to that of FIGS. 5 and 6. When the bend limiting device 1 is bent along a positive direction or a negative direction of the third direction Z, a minimum value θ' of an included angle θ formed between two adjacent limiting blocks 220 is limited by two connected limiting structures 221 of the two adjacent limiting blocks 220.

In this embodiment, since the cross section 223 of each of the limiting structures 221 is configured to be the isosceles triangle like shape, and the two base angles b of the isosceles triangle like shape are determined to respectively range from 10° to 80°, no matter the bend limiting device 1 is bent along the positive direction or the negative direction of the third direction Z, the minimum value θ' of the included angle θ formed between the two adjacent limiting blocks 220 can be limited to be greater than 20°. Therefore, a radius of curvature of each of the limiting chains 200 can be limited to be greater than a preset value without being excessively bent or being excessively folded.

In the first embodiment, since the bend limiting device 1 is provided with two parallel limiting chains 200, the bend limiting device 1 can provide a one-dimensional bending protection effect. In the second embodiment, since the bend limiting device 1 is provided with two intersecting limiting chains 200, the bend limiting device 1 can provide a two-dimensional bending protection effect. Therefore, compared with the first embodiment, the bend limiting device 1 of the second embodiment further strengthens a bending angle limiting effect of each of the limiting chains 200.

Third Embodiment

Figure 9:
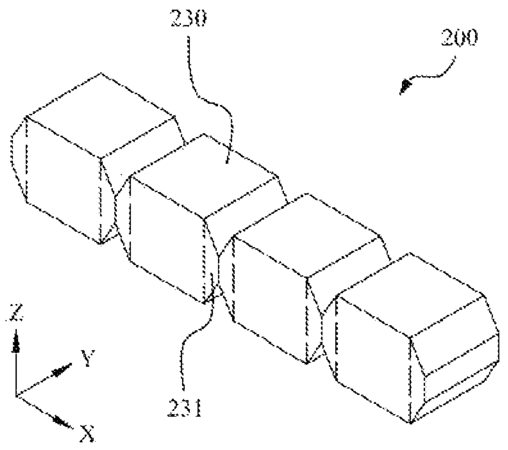
FIG. 9 is another partial structural schematic diagram of one of limiting chains shown in FIG. 1.

Please refer to FIG. 9, which is another partial structural schematic diagram of one of the limiting chains 200 shown in FIG. 1. In this embodiment, each of the limiting chains 200 includes a plurality of limiting blocks 230 arranged along the first direction X. Each of the limiting blocks 230 includes a plurality of limiting structures 231. One of the limiting structures 231 of one of the limiting blocks 230 is connected to one of the limiting structures 231 of another one of the limiting blocks 230. In this embodiment, each of the limiting blocks 230 has two limiting structures 231 arranged opposite to each other, and one of the limiting structures 231 positioned in a positive direction of the first direction X of one of the limiting blocks 230 is connected to one of the limiting structures 231 positioned in a negative direction of the first direction X of another one of the limiting blocks 230.

Figure 10:
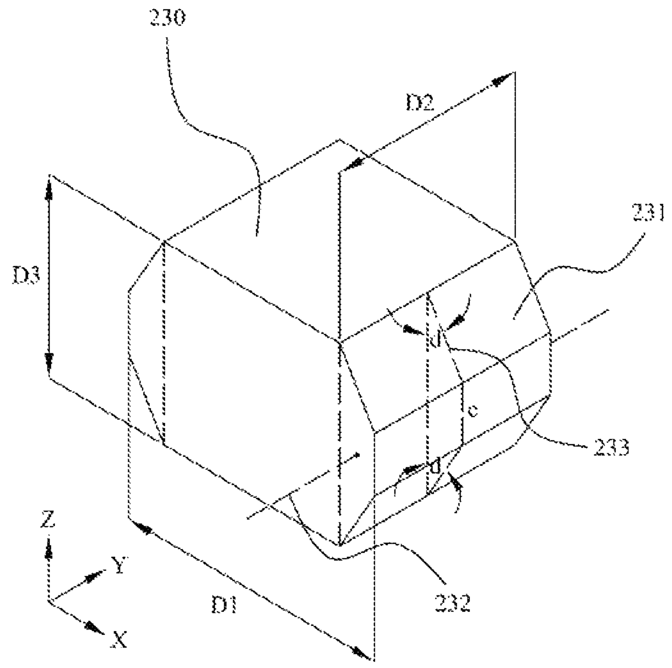
FIG. 10 is a structural schematic diagram of one of limiting blocks shown in FIG. 9.

Please refer to FIG. 10, which is a structural schematic diagram of one of the limiting blocks 230 shown in FIG. 9. Each of the limiting blocks 230 includes the limiting structures 231. Each of the limiting structures 231 is prism shaped. An axial direction 232 of each of the limiting structures 231 is parallel to the second direction Y.

As shown in FIG. 10, each of the limiting structures 231 is rectangular prism shaped, and a cross section 233 of each of the limiting structures 231 is isosceles trapezoid shaped. An upper base c of the isosceles trapezoid like shape is positioned at an outer side of each of the limiting blocks 230. In this embodiment, two acute angles d of the isosceles trapezoid like shape respectively range from 10° to 80°.

In this embodiment, a length D1 of each of the limiting blocks 230 in the first direction X ranges from one millimeter to one centimeter, a length D2 of each of the limiting blocks 230 in the second direction Y ranges from one millimeter to one centimeter, and a length D3 of each of the limiting blocks 230 in the third direction Z ranges from one millimeter to one centimeter. A size of each of the limiting blocks 230 of the present invention is not limited to this configuration, and the size of each of the limiting blocks 230 can be adjusted according to actual requirements.

In the first embodiment, each of the limiting structures 211 adopts a triangular prism shaped structure. In the third embodiment, each of the limiting structures 231 adopts a rectangular prism shaped structure. As shown in FIG. 4, since the cross section 213 of each of the limiting structures 211 of the first embodiment is isosceles triangle shaped, so one of the limiting structures 211 of the limiting blocks 210 is connected to one of the limiting structures 211 of another one of the limiting blocks 210 in a line contact manner. As shown in FIG. 10, since the cross section 233 of each of the limiting structures 231 of the third embodiment is isosceles trapezoid shaped, so one of the limiting structures 231 of the limiting blocks 230 is connected to one of the limiting structures 231 of another one of the limiting blocks 230 in a surface contact manner. Therefore, compared with the limiting structures 211 of the first embodiment, the limiting structures 231 of the third embodiment can provide a more stable connection between the limiting blocks 230.

Figure 11:
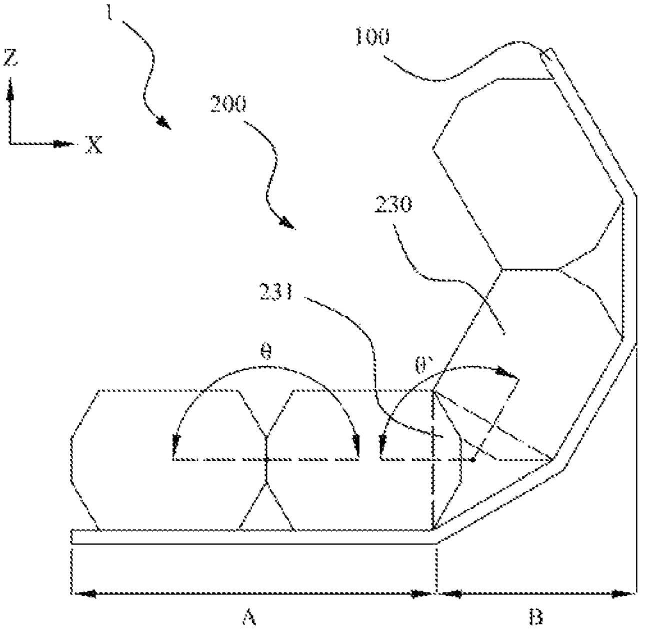
FIG. 11 is a partial side view of one of the limiting chains shown in FIG. 9 in a bending state.

Please refer to FIG. 11, which is a partial side view of one of the limiting chains 200 shown in FIG. 9 in a bending state. FIG. 11 shows a state that the bend limiting device 1 is bent along a positive direction of the third direction Z. In an unbent region A of the bend limiting device 1, an included angle θ formed between two adjacent limiting blocks 230 is a flat angle, which is 180°. In a bent region B of the bend limiting device 1, a minimum value θ' of the included angle θ formed between the two adjacent limiting blocks 230 is limited by two connected limiting structures 231 of the two adjacent limiting blocks 230.

Figure 12:
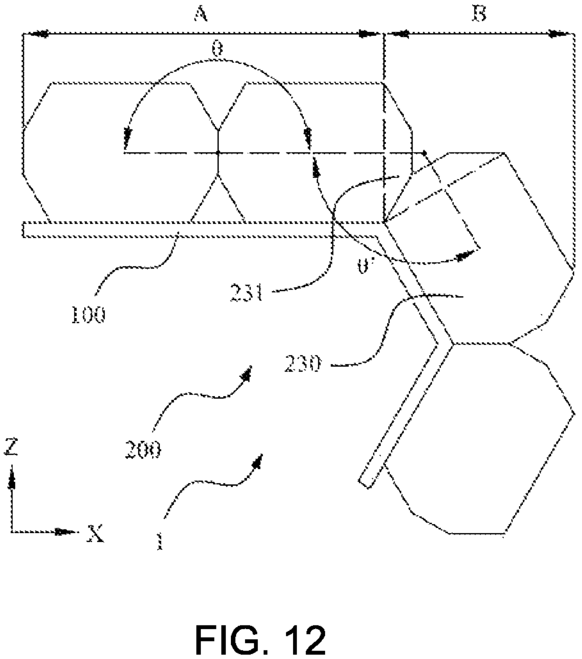
FIG. 12 is a partial side view of one of the limiting chains shown in FIG. 9 in another bending state.

Please refer to FIG. 12, which is a partial side view of one of the limiting chains 200 shown in FIG. 9 in another bending state. FIG. 12 shows a state that the bend limiting device 1 is bent along a negative direction of the third direction Z. In an unbent region A of the bend limiting device 1, the included angle θ formed between two adjacent limiting blocks 230 is a flat angle, which is 180°. In a bent region B of the bend limiting device 1, a minimum value θ' of the included angle θ formed between the two adjacent limiting blocks 230 is also limited by two connected limiting structures 231 of the two adjacent limiting blocks 230.

In this embodiment, since the cross section 233 of each of the limiting structures 231 is configured to be the isosceles trapezoid like shape, and the two acute angles d of the isosceles trapezoid like shape are determined to respectively range from 10° to 80°, no matter the bend limiting device 1 is bent along the positive direction or the negative direction of the third direction Z, the minimum value θ' of the included angle θ formed between the two adjacent limiting blocks 230 can be limited to be greater than 20°. Therefore, a radius of curvature of each of the limiting chains 200 can be limited to be greater than a preset value without being excessively bent or being excessively folded.

Fourth Embodiment

Figure 13:
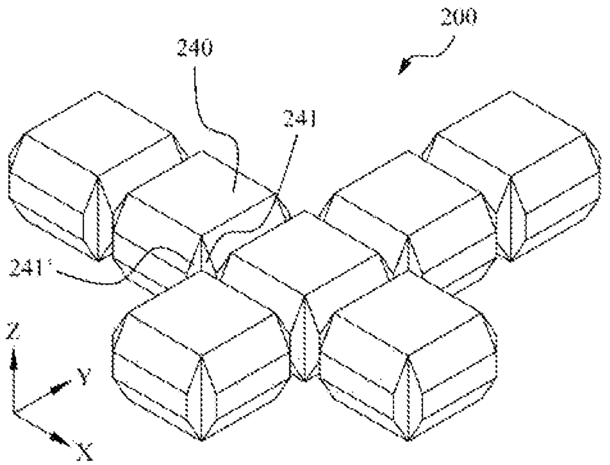
FIG. 13 is another partial structural schematic diagram of limiting chains shown in FIG. 2.

Please refer to FIG. 13, which is another partial structural schematic diagram of the limiting chains 200 shown in FIG. 2. In this embodiment, one of the limiting chains 200 includes a plurality of limiting blocks 240 arranged along the first direction X, and another one of the limiting chains 200 includes a plurality of limiting blocks 240 arranged along the second direction Y. Since the first direction X is perpendicular to the second direction Y, the two limiting chains 200 cross to each other.

Each of the limiting blocks 240 includes a plurality of limiting structures 241 and 241'. One of the limiting structures 241 or 241' of one of the limiting blocks 240 is connected to one of the limiting structures 241 or 241' of another one of the limiting blocks 240. In this embodiment, each of the limiting blocks 240 includes two limiting structures 241 arranged opposite to each other and two limiting structures 241' arranged opposite to each other. One of the limiting structures 241 positioned in a positive direction of the first direction X of one of the limiting blocks 240 is connected to one of the limiting structures 241 positioned in a negative direction of the first direction X of another one of the limiting blocks 240, and one of the limiting structures 241' positioned in a positive direction of the second direction Y of one of the limiting blocks 240 is connected to the limiting structures 241' positioned in a negative direction of the second direction Y of another one of the limiting blocks 240.

Figure 14:
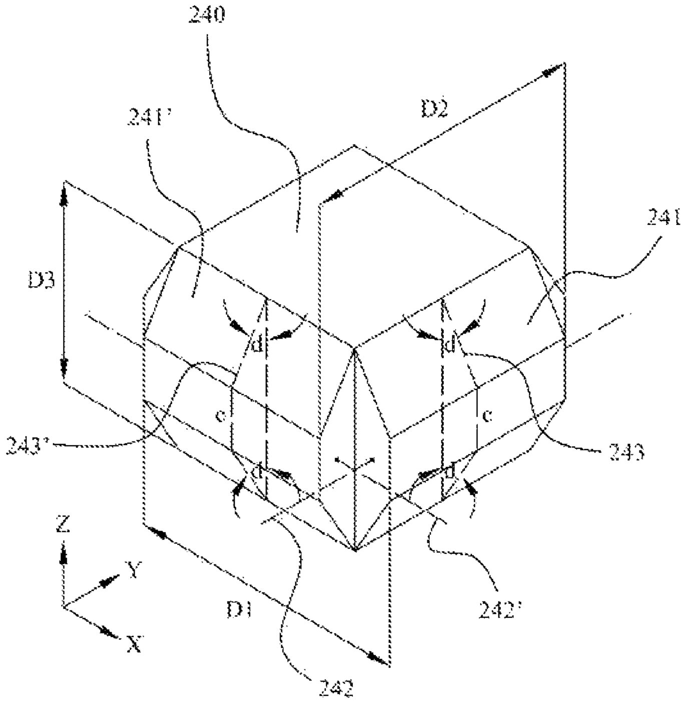
FIG. 14 is a structural schematic diagram of one of limiting blocks shown in FIG. 13.

Please refer to FIG. 14, which is a structural schematic diagram of one of the limiting blocks 240 shown in FIG. 13. Each of the limiting blocks 240 includes the limiting structures 241 and 241'. Each of the limiting structures 241 and 241' is prism shaped. An axial direction 242 of each of the limiting structures 241 is parallel to the second direction Y, and an axial direction 242' of each of the limiting structures 241' is parallel to the first direction X.

As shown in FIG. 14, each of the limiting structures 241 and 241' is rectangular prism shaped, a cross section 243 of each of the limiting structures 241 is isosceles trapezoid shaped, and a cross section 243 of each of the limiting structures 241' is the isosceles trapezoid like shape. An upper base c of the isosceles trapezoid like shape is positioned at an outer side of each of the limiting blocks 240. In this embodiment, two acute angles d of the isosceles trapezoid like shape respectively range from 10° to 80°.

In this embodiment, a length D1 of each of the limiting blocks 240 in the first direction X ranges from one millimeter to one centimeter, a length D2 of each of the limiting blocks 240 in the second direction Y ranges from one millimeter to one centimeter, and a length D3 of each of the limiting blocks 240 in the third direction Z ranges from one millimeter to one centimeter. A size of each of the limiting blocks 240 of the present invention is not limited to this configuration, and the size of each of the limiting blocks 240 can be adjusted according to actual requirements.

In the second embodiment, each of the limiting structures 221 and 221' adopts a triangular prism shaped structure. In the fourth embodiment, each of the limiting structures 241 and 241' adopts a rectangular prism shaped structure. As shown in FIG. 8, since the cross section 223 of each of the limiting structures 221 and 221' of the second embodiment is isosceles triangle shaped, so one of the limiting structures 221 or 221' of the limiting blocks 220 is connected to one of the limiting structures 221 or 221' of another one of the limiting blocks 220 in a line contact manner. As shown in FIG. 14, since the cross section 243 of each of the limiting structures 241 and 241' of the fourth embodiment is isosceles trapezoid shaped, so one of the limiting structures 241 or 241' of the limiting blocks 240 is connected to one of the limiting structures 241 or 241' of another one of the limiting blocks 240 in a surface contact manner. Therefore, compared with the limiting structures 221 and 221' of the second embodiment, the limiting structures 241 and 241' of the fourth embodiment can provide a more stable connection between the limiting blocks 240.

The bending state of the bend limiting device 1 in this embodiment is similar to that of FIGS. 11 and 12. When the bend limiting device 1 is bent along a positive direction or a negative direction of the third direction Z, a minimum value θ' of an included angle θ formed between two adjacent limiting blocks 240 is limited by two connected limiting structures 241 of the two adjacent limiting blocks 240.

In this embodiment, since the cross section 243 of each of the limiting structures 241 is configured to be the isosceles trapezoid like shape, and the two acute angles d of the isosceles trapezoid like shape are determined to respectively range from 10° to 80°, no matter the bend limiting device 1 is bent along the positive direction or the negative direction of the third direction Z, the minimum value θ' of the included angle θ formed between the two adjacent limiting blocks 240 can be limited to be greater than 20°. Therefore, a radius of curvature of each of the limiting chains 200 can be limited to be greater than a preset value without being excessively bent or being excessively folded.

In the third embodiment, since the bend limiting device 1 is provided with two parallel limiting chains 200, the bend limiting device 1 can provide a one-dimensional bending protection effect. In the fourth embodiment, since the bend limiting device 1 is provided with two intersecting limiting chains 200, the bend limiting device 1 can provide a two-dimensional bending protection effect. Therefore, compared with the third embodiment, the bend limiting device 1 of the fourth embodiment further strengthens a bending angle limiting effect of each of the limiting chains 200.

In any of the above embodiments, a material of each of the limiting blocks 210-240 of each of the limiting chains 200 includes a rigid material. Since the material of each of the limiting blocks 210-240 is made of the rigid material, when each of the limiting chains 200 is bent following the bend limiting device 1, the rigid material can provide a sufficient strength of the bending angle limiting effect. In detail, the material of each of the limiting blocks 210-240 is metal or polyvinyl chloride (PVC). The material of each of the limiting blocks 210-240 of the present invention is not limited to this configuration, and the material of each of the limiting blocks 210-240 can be adjusted according to actual requirements.

In any of the above embodiments, a material of the flexible support film 100 includes a flexible material. Since the material of the flexible support film 100 is made of the flexible material, when the flexible support film 100 is bent following the bent limiting device 1, the flexible material can be properly expanded or contracted to ensure that the limiting blocks 210-240 of each of the limiting chains 200 remain connected to each other in any state. In detail, the material of the flexible support film 100 is polyimide (PI). The material of the flexible support film 100 of the present invention is not limited to this configuration, and the material of the flexible support film 100 can be adjusted according to actual requirements.

Figure 15:
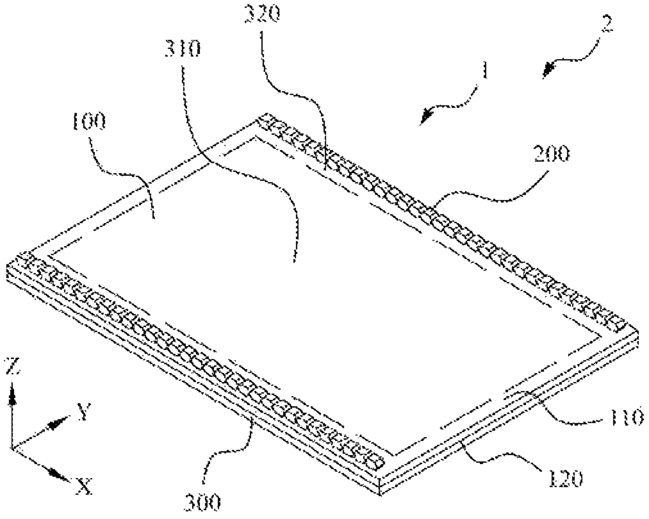
FIG. 15 is a structural schematic diagram of a flexible display device of the present invention.
Figure 16:
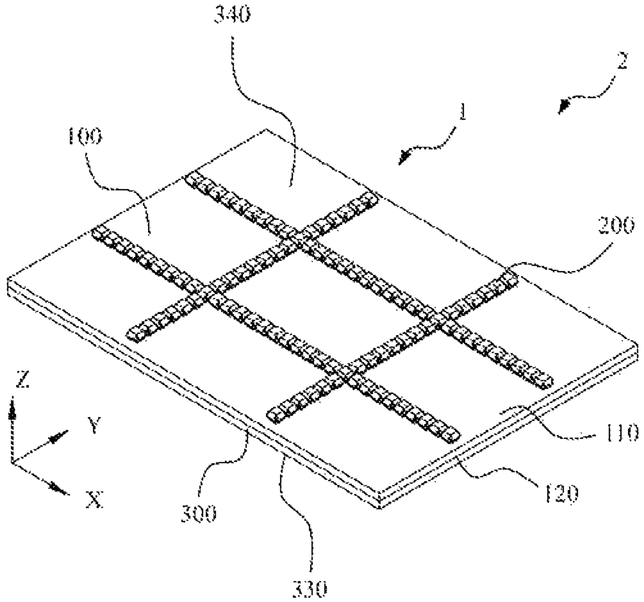
FIG. 16 is another structural schematic diagram of a flexible display device of the present invention.

The present invention further provides a flexible display device 2. Please refer to FIG. 15, which is a structural schematic diagram of the flexible display device 2 of the present invention. Please refer to FIG. 6, which is another structural schematic diagram of the flexible display device 2 of the present invention. As shown in FIGS. 15 and 16, the flexible display device 2 includes the flexible display panel 300 and the bend limiting device 1 of any of the above embodiments. The flexible display panel 300 is disposed on the second surface 120 of the flexible support film 100 opposite to the first surface 110.

Fifth Embodiment

As shown in FIG. 15, the flexible display panel 300 includes a display region 310 and a non-display region 320.

The limiting chains 200 of the bend limiting device 1 are disposed in the non-display region 320 of the flexible display panel 300.

In this embodiment, two opposite side edges of the non-display region 320 positioned on the flexible display panel 300 respectively have one of the limiting chains 200 disposed along the first direction X. Since the limiting chains 200 are disposed in the non-display region 320 of the flexible display panel 300, the bent limiting device 1 does not shield a display image of the flexible display panel 300.

Sixth Embodiment

As shown in FIG. 16, the flexible display panel 300 includes a light-emitting surface 330 and a non-light-emitting surface 340. The light emitting surface 330 is configured to provide the display image of the flexible display panel 300. The limiting chains 200 of the bend limiting device 1 are intersected and dispersed on the flexible display panel 300 in a tic-tac-toe grid manner.

In this embodiment, since the limiting chains 200 are intersected and dispersed on the flexible display panel 300, the limiting chains 200 can provide the bending angle limiting effect of an entire plane of the flexible display panel 300. Therefore, each region of the flexible display panel 300 can be evenly subjected to the bending protection effect.

In order to achieve the above effect, the limiting chains 200 of the bend limiting device 1 are disposed on the non-light-emitting surface 330 of the flexible display panel 300. In other words, the limiting chains 200 are disposed on an opposite side of the light emitting surface 330 to prevent the limiting chains 200 from shielding the display image of the flexible display panel 300.

In any of the above embodiments, the flexible display panel 300 includes a flexible liquid crystal display (LCD) panel, an organic light-emitting diode (OLED) display panel, a quantum dot light-emitting diode (QLED) display panel, a mini light-emitting diode (mini-LED) display panel, or a micro light-emitting diode (micro-LED) display panel, etc. A type of the flexible display panel 300 of the present invention is not limited to this configuration, and the type of the flexible display panel 300 can be adjusted according to actual requirements.

In any of the above embodiments, the flexible display device 2 includes a rollable flexible display device, a foldable flexible display device, or a special-shaped flexible display device. Application scenario of the flexible display device 2 of the present invention is not limited to this configuration, and the application scenario of the flexible display device 2 can be adjusted according to actual requirements.

When the bend limiting device 1 of the present invention is bent, the two connected limiting structures 211-241' of the two adjacent limiting blocks 210-240 limit the minimum value θ' of the included angle θ formed between the two adjacent limiting blocks 210-240. By configuring each of the limiting structures 211-241' on the outer side of each of the limiting blocks 210-240 as the prism like shape and configuring the axial direction 212-242' of each of the limiting structures 211-241' to be parallel to the first direction X or the second direction Y, the radius of curvature of each of the limiting chains 200 can be limited to be greater than a preset value without being excessively bent. Furthermore, benefiting from the bending protection effect of the bend limiting device 1, a minimum radius of curvature of the flexible display panel 300 having the bend limiting device 1 of the flexible display device 2 can be limited, so the flexible display device 2 can be prevented from being improperly bent or being improperly rolled, thereby extending a lifespan of the flexible display device 2.

The description above are only preferred embodiments of the invention. It should be pointed out that to those of ordinary skill in the art, various improvements and embellishments may be made without departing from the principle of the present invention, and these improvements and embellishments are also deemed to be within the scope of protection of the present invention.

What is claimed is:

1. A bend limiting device, comprising:

a flexible support film defined a first direction, a second direction perpendicular to the first direction, and a third direction perpendicular to the first direction and the second direction, wherein the first direction and the second direction are parallel to a first surface of the flexible support film; and a plurality of limiting chains disposed on the first surface of the flexible support film, wherein each of the limiting chains comprises a plurality of limiting blocks arranged along the first direction or the second direction, each of the limiting blocks comprises a plurality of limiting structures, and one of the limiting structures of one of the limiting blocks is connected to another one of the limiting structures of another one of the limiting blocks;

wherein an included angle is formed between two adjacent limiting blocks, and when the bend limiting device is bent along a positive direction or a negative direction of the third direction, two connected limiting structures of the two adjacent limiting blocks limit a minimum value of the included angle between the two adjacent limiting blocks.

2. The bend limiting device according to claim 1, wherein each of the limiting structures is prism shaped, and an axial direction of each of the limiting structures is parallel to the first direction or the second direction.

3. The bend limiting device according to claim 2, wherein each of the limiting structures is triangular prism shaped, a cross section of each of the limiting structures is isosceles triangle shaped, and a vertex angle of the isosceles triangle like shape is positioned at an outer side of each of the limiting blocks.

4. The bend limiting device according to claim 3, wherein two base angles of the isosceles triangle like shape range from 10° to 80°.

5. The bend limiting device according to claim 2, wherein each of the limiting structures is rectangular prism shaped, a cross section of each of the limiting structures is isosceles trapezoid shaped, and an upper base of the isosceles trapezoid like shape is positioned at an outer side of each of the limiting blocks.

6. The bend limiting device according to claim 5, wherein two acute angles of the isosceles trapezoid like shape range from 10° to 80°.

7. The bend limiting device according to claim 1, wherein a length of each of the limiting blocks in the first direction ranges from one millimeter to one centimeter, a length of each of the limiting blocks in the second direction ranges from one millimeter to one centimeter, and a length of each of the limiting blocks in the third direction ranges from one millimeter to one centimeter.

8. The bend limiting device according to claim 1, wherein the limiting blocks are made of a rigid material.

9. A flexible display device, comprising a bend limiting device, wherein the bend limiting device comprises:

a flexible support film defined a first direction, a second direction perpendicular to the first direction, and a third direction perpendicular to the first direction and the second direction, wherein the first direction and the second direction are parallel to a first surface of the flexible support film; and a plurality of limiting chains disposed on the first surface of the flexible support film, wherein each of the limiting chains comprises a plurality of limiting blocks arranged along the first direction or the second direction, each of the limiting blocks comprises a plurality of limiting structures, and one of the limiting structures of one of the limiting blocks is connected to another one of the limiting structures of another one of the limiting blocks;

wherein an included angle is formed between two adjacent limiting blocks, and when the bend limiting device is bent along a positive direction or a negative direction of the third direction, two connected limiting structures of the two adjacent limiting blocks limit a minimum value of the included angle between the two adjacent limiting blocks.

10. The flexible display device according to claim 9, wherein each of the limiting structures is prism shaped, and an axial direction of each of the limiting structures is parallel to the first direction or the second direction.

11. The flexible display device according to claim 10, wherein each of the limiting structures is triangular prism shaped, a cross section of each of the limiting structures is isosceles triangle shaped, and a vertex angle of the isosceles triangle like shape is positioned at an outer side of each of the limiting blocks.

12. The flexible display device according to claim 11, wherein two base angles of the isosceles triangle like shape range from 10° to 80°.

13. The flexible display device according to claim 10, wherein each of the limiting structures is rectangular prism shaped, a cross section of each of the limiting structures is isosceles trapezoid shaped, and an upper base of the isosceles trapezoid like shape is positioned at an outer side of each of the limiting blocks.

14. The flexible display device according to claim 13, wherein two acute angles of the isosceles trapezoid like shape range from 10° to 80°.

15. The flexible display device according to claim 9, wherein a length of each of the limiting blocks in the first direction ranges from one millimeter to one centimeter, a length of each of the limiting blocks in the second direction ranges from one millimeter to one centimeter, and a length of each of the limiting blocks in the third direction ranges from one millimeter to one centimeter.

16. The flexible display device according to claim 9, wherein the limiting blocks are made of a rigid material.

17. The flexible display device according to claim 9, further comprising a flexible display panel, wherein the flexible display panel is disposed on a second surface opposite to the first surface.

18. The flexible display device according to claim 17, wherein the limiting chains of the bend limiting device are disposed at a side edge of the flexible display panel.

19. The flexible display device according to claim 17, wherein the limiting chains of the bend limiting device are disposed on a non-light-emitting surface of the flexible display panel.

20. The flexible display device according to claim 17, wherein the flexible display panel comprises a flexible liquid crystal display, an organic light-emitting diode display panel, a quantum dot light-emitting diode display panel, a mini light-emitting diode display panel, or a micro light-emitting diode display panel.

* * * * *